United States Patent
Schoen et al.

(10) Patent No.: US 10,018,321 B2
(45) Date of Patent: Jul. 10, 2018

(54) INTERIOR AIRCRAFT LIGHT UNIT AND METHOD OF PRODUCING AN INTERIOR AIRCRAFT LIGHT UNIT

(71) Applicant: Goodrich Lighting Systems GmbH, Lippstadt (DE)

(72) Inventors: Christian Schoen, Mainz (DE); Stefan Becker, Lippstadt (DE); Bjorn Schallenberg, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 279 days.

(21) Appl. No.: 14/869,139

(22) Filed: Sep. 29, 2015

(65) Prior Publication Data
US 2016/0097503 A1 Apr. 7, 2016

(30) Foreign Application Priority Data

Oct. 2, 2014 (EP) .................................. 14187536

(51) Int. Cl.
*F21S 8/00* (2006.01)
*F21S 8/10* (2006.01)
(Continued)

(52) U.S. Cl.
CPC .............. *F21S 48/00* (2013.01); *B64D 45/00* (2013.01); *F21S 43/00* (2018.01); *G08B 7/062* (2013.01); *G09F 13/0409* (2013.01); *G09F 13/10* (2013.01); *G09F 21/06* (2013.01); *B64D 2045/007* (2013.01); *F21W 2106/00* (2018.01);
(Continued)

(58) Field of Classification Search
CPC ......... F21S 48/00; B64D 45/00; G08B 7/062; G09F 13/0409; G09F 13/10; G09F 13/16
See application file for complete search history.

(56) References Cited

U.S. PATENT DOCUMENTS

| 3,296,431 A | 1/1967 | Green |
| 4,005,538 A * | 2/1977 | Tung ........................ G09F 13/10 40/564 |
| 2004/0221753 A1 * | 11/2004 | Goodrich ................. B41M 1/12 101/123 |

FOREIGN PATENT DOCUMENTS

| EP | 1496488 A1 | 1/2005 |
| EP | 1571640 A2 | 9/2005 |

OTHER PUBLICATIONS

European Search Report for application No. EP14187536.9; dated Apr. 2, 2015, 8 pages.

* cited by examiner

*Primary Examiner* — Anabel Ton
(74) *Attorney, Agent, or Firm* — Cantor Colburn LLP

(57) ABSTRACT

An interior aircraft light unit includes at least one light source, in operation emitting light with a source side light intensity distribution, the source side light intensity distribution having a first intensity region and a second intensity region, with the first intensity region having a higher light intensity than the second intensity region, and a semi-transparent layer, disposed between the at least one light source and an outside of the interior aircraft light unit, for transforming the source side light intensity distribution into an adjusted light intensity distribution, wherein the semi-transparent layer has a transparency distribution having a lower degree of transparency in the first intensity region than in the second intensity region, such that the adjusted light intensity distribution is closer to an even light intensity distribution than the source side light intensity distribution.

12 Claims, 3 Drawing Sheets

(51) Int. Cl.
  *B64D 45/00*  (2006.01)
  *G08B 7/06*  (2006.01)
  *G09F 13/04*  (2006.01)
  *G09F 13/10*  (2006.01)
  *G09F 21/06*  (2006.01)
  *F21S 43/00*  (2018.01)
  *G09F 13/18*  (2006.01)
  *F21Y 115/10*  (2016.01)
  *F21W 107/30*  (2018.01)
  *F21W 106/00*  (2018.01)

(52) U.S. Cl.
  CPC ...... *F21W 2107/30* (2018.01); *F21Y 2115/10* (2016.08); *G09F 2013/0459* (2013.01); *G09F 2013/1813* (2013.01)

INTERIOR AIRCRAFT LIGHT UNIT AND METHOD OF PRODUCING AN INTERIOR AIRCRAFT LIGHT UNIT

FOREIGN PRIORITY

This application claims priority to European Patent Application No. 14187536.9 filed Oct. 2, 2014, the entire contents of which is incorporated herein by reference.

TECHNICAL FIELD

The present invention relates to interior aircraft lighting. In particular, it relates to interior signal lights, such as exit signs.

BACKGROUND OF THE INVENTION

For such exit signs, the Federal Aviation Regulations (FAR) require a fairly even light intensity distribution. In particular, the FAR set limit values for the ratio between the brightest portion of the exit sign and the least bright portion of the exit sign. An exemplary limit value for this ratio is 3. In order to satisfy such limit values, prior art approaches have employed very complicated optical structures, commonly employing a large number of light sources. Such approaches have proven to be not satisfactory with respect to their reliability. Also, their production has been found to be too complicated and cumbersome.

Accordingly, it would be beneficial to provide an interior aircraft light unit that is able to satisfy such light intensity ratio requirements, is less complex to produce and has an acceptable reliability.

SUMMARY

Exemplary embodiments of the invention include an interior aircraft light unit, comprising at least one light source, in operation emitting light with a source side light intensity distribution, the source side light intensity distribution comprising a first intensity region and a second intensity region, with the first intensity region having a higher light intensity than the second intensity region, and a semi-transparent layer, disposed between the at least one light source and an outside of the interior aircraft light unit, for transforming the source side light intensity distribution into an adjusted light intensity distribution, wherein the semi-transparent layer has a transparency distribution having a lower degree of transparency in the first intensity region than in the second intensity region, such that the adjusted light intensity distribution is closer to an even light intensity distribution than the source side light intensity distribution.

The semi-transparent layer, having different degrees of transparency in different regions, is a very efficient means of evening out the source side light intensity distribution and achieving an evened out light intensity distribution on the other side of the semi-transparent layer. In particular, very bright spots of the source side light intensity distribution, such as those positions where the light source(s) is (are) provided, can be shaded, such that these "hot spots" do not lead to very high ratios between maximum and minimum light intensity values of the interior aircraft light unit. Due to this shading of such "hot spots", the light sources may be operated at a higher power rating, emitting more light and leading to a more efficient operation thereof in terms of illumination versus power consumption. Moreover, when operated at such higher power levels, the light sources may be less sensitive to variations in the supplied electricity and less sensitive to ageing. In particular, the light sources may be less prone to shifts in the lumen output over time. By being able to operate the light sources at such a higher power rating, an overall reduced number of light sources is needed for achieving a desired overall light yield. By reducing the number of light sources and being able to operate them at a higher power level, the overall efficiency of the interior aircraft light unit may also be increased. This leads to the counter-intuitive result that, despite the shading of the light sources, i.e. despite the blocking of some of the emitted light, an overall higher efficiency may be achieved as compared to prior art approaches where a large number of light sources was run below their most efficient power rating in order to achieve the required fairly even light intensity distribution.

The semi-transparent layer is an ideal means of achieving said light blocking/light shading. The semi-transparent may be a flat structure, such as a sheet or film structure, that can be easily integrated into an interior aircraft light unit, such as on the inside of a lens cover.

The source side light intensity distribution and the transparency distribution are spatial distributions. In other words, those distributions can be described as a plurality of light intensity values or transparency values for particular positions. In yet other words, the source side light intensity distributions and the transparency distributions are functions of the light intensity and the transparency vs. position. In the case of the transparency distribution, the transparency values can be described as a function of the position on the semi-transparent layer. In the case of the source side light intensity distribution, the distribution can be described in terms of light intensity values vs. angles from a reference point, such as the middle of the mounting structure, to which the light source(s) is (are) mounted. The source side light intensity distribution may also be described in a projected plane, in which case the light intensity distribution may be expressed as a luminance distribution in order to correctly account for path differences between the light source(s) and the projected plane. The projected plane may be the semi-transparent layer.

The semi-transparent layer has a lower degree of transparency in the first intensity region of the source side light intensity distribution than in the second intensity region of the source side light intensity distribution. This can also be expressed differently. In particular, it can be said that the semi-transparent layer has different regions of different degrees of transparency, which may also be seen as different degrees of shading/blocking of the light coming from the at least one light source. In particular, the semi-transparent layer may have a first shading region and a second shading region, wherein the first shading region has a lower degree of transparency than the second shading region. The first shading region may substantially correspond in location with the first intensity region of the source side light intensity distribution on the semi-transparent layer. Further, the second shading region may substantially correspond in location to the second intensity region of the source side light intensity distribution on the semi-transparent layer. In this way, the light of the first intensity region of the source side light intensity distribution reaches the semi-transparent layer at a location where the semi-transparent layer is less transparent than in the distinct location where the light of the second intensity region of the source side light intensity distribution reaches the semi-transparent layer.

It is possible that the source side light intensity distribution comprises further intensity regions apart from the first and second intensity regions. In particular, the source side light intensity distribution may have three or four or five or six or seven or eight or more light intensity regions. Each light intensity region may be characterized by covering those portions of the source side light intensity distribution where the light intensity values are between a respective minimum light intensity value and a respective maximum light intensity value. In other words, the intensity regions may be cascaded brackets of light intensity values. In yet other words, the light intensity regions may form a ladder of light intensity intervals. It is pointed out that it is not a requirement that the light intensity regions jointly cover the entire source side light intensity distribution. It is also possible that certain parts of the source side light intensity distribution do not belong to any intensity region. Further, the spatial extent of the intensity regions is not restricted, neither is the number of intensity regions limited. Accordingly, it is possible that the source side light intensity distribution is split up into a plurality of distribution elements according to a set resolution, with each of the elements forming its own intensity region or with multiple elements respectively being combined for forming particular intensity regions.

In an analogous manner, the semi-transparent layer may also be split up into various regions of different degrees of transparency. Those regions of different degrees of transparency, also referred to as shading regions, may correspond in location to the intensity regions of the source side light intensity distribution, when projected to the semi-transparent layer. However, the shading regions may also have different extents as compared to the intensity regions of the source side light intensity distribution, when projected to the semi-transparent layer.

By using the semi-transparent layer, the adjusted light intensity distribution, i.e. the light intensity distribution on the "downstream" side of the semi-transparent layer, is closer to an even light intensity distribution than the source side light intensity distribution. The measure of a light intensity distribution being closer or less close to an even light intensity distribution is defined as follows. A ratio between the maximum light intensity, i.e. the intensity value at the spatial position with the highest brightness, is compared to the minimum light intensity, i.e. the intensity value at the position with the lowest brightness. The ratio between the maximum light intensity and the minimum light intensity is determined. The lower this ratio is, the closer the light intensity distribution in question is to an even light intensity distribution. Accordingly, the ratio between the maximum light intensity value and the minimum light intensity value of the adjusted light intensity distribution is lower than the ratio of the maximum light intensity value to the minimum light intensity value of the source side light intensity distribution. It is also possible to additionally/alternatively measure the ratio in terms of luminance. The luminance values right on the outside of the semi-transparent layer may be measured to determine the ratio between the maximum luminance value and the minimum luminance value for the adjusted light intensity distribution. The measurement may be repeated in the absence of the semi-transparent layer, but at the location where the semi-transparent layer would be, i.e. at the same location with respect to the light sources, to determine the ratio between the maximum luminance value and the minimum luminance value for the source side light intensity distribution.

The source side light intensity distribution is the combined light intensity distribution of the one or more light sources. Accordingly, if more than one light source is present, the individual light intensity distributions of the several light sources add up to form the combined source side light intensity distribution.

The term semi-transparent layer refers to a layer that allows for a portion of the impinging light to pass through, while at the same time blocking a portion of the impinging light. The semi-transparent layer has different degrees of transparency in different regions of the semi-transparent layer. In other words, different regions of the semi-transparent layer may allow different percentages of the light, reaching the semi-transparent layer, to pass through. These different regions of different transparency levels are jointly referred to as the semi-transparent layer having a transparency distribution.

The different degrees of transparency may be achieved in a variety of different ways. For example, the semi-transparent layer may have a different opacity in different regions, i.e. the transparent layer may have a material or coating or any other suitable structure that effects desired levels of transparency in the different regions. It is also possible that the semi-transparent layer comprises fully opaque elements that are distributed across the semi-transparent layer. These fully opaque elements may form a pattern on the semi-transparent layer, with a respective density of these fully opaque elements defining the level of transparency in particular regions of the semi-transparent layer. It is pointed out that any suitable form of providing different levels of transparency can be used for providing the semi-transparent layer.

According to a further embodiment, each of the at least one light source has a main light emission direction and the first intensity region includes the main light emission direction of the at least one light source. In other words, if there is one light source only, the first intensity region include the main light emission direction of said one light source. If there are several light sources, the first intensity region includes the main light emission directions of these several light sources. By providing a higher degree of shading/light blocking in the main light emission directions of the light source(s), the hot spots of the light source(s), i.e. the very bright spots around the main light emission directions, can be alleviated. This greatly helps in evening out the source side light intensity distribution to an acceptable limit.

According to a further embodiment, the adjusted light intensity distribution has a ratio between its maximum light intensity and its minimum light intensity of at most 3. In this way, the adjusted light intensity distribution satisfies FAR requirements for exit sign lights. A ratio between the maximum light intensity and the minimum light intensity of at most 3 indicates a very even light intensity distribution for interior aircraft lights. The adjusted light intensity distribution may also have a ratio between its maximum luminance value and its minimum luminance value on the "downstream" side of the semi-transparent layer of at most 3.

According to a further embodiment, the source side light intensity distribution has a ratio between its maximum light intensity and its minimum light intensity of more than 10, in particular of more than 20. In particular, the source side light intensity distribution of that portion of the light that reaches the semi-transparent layer, may have said ratio between its maximum light intensity and its minimum light intensity of more than 10, in particular of more than 20. In the case that such a highly uneven light intensity distribution reaches the semi-transparent layer and that the adjusted light intensity distribution has a ratio between its maximum light intensity and its minimum light intensity of at most 3, the semi-transparent layer has a highly evening effect on the source side light intensity distribution.

According to a further embodiment, the transparency distribution of the semi-transparent layer corresponds to an inverse of the source side light intensity distribution.

According to a further embodiment, the transparency distribution of the semi-transparent layer consists of a plurality of transparency values and the source side light intensity distribution consists of a plurality of source side light intensity values, with each of the plurality of transparency values being within +/−50% of an inverse of the corresponding source side light intensity value, in particular within +/−20%. Such coupling of the transparency values to the inverse of the corresponding source side light intensity values leads to an effective evening out of the source side light intensity distribution. Further, such coupling of the transparency values to the source side light intensity values allows for an easy producing of the semi-transparent layer, because the source side light intensity distribution may be measured and inverted, with the result of this measurement and inversion forming the ideal shading filter that would lead to a perfectly even adjusted light intensity distribution. However, due to measuring inaccuracies, a limited resolution for measuring and inverting, a limited number of transparency levels, and a limited resolution on the semi-transparent layer, providing the plurality of transparency values within +/−50% of the inverse of the corresponding source side light intensity value is sufficient for providing a very even adjusted light intensity distribution. The number of the plurality of transparency values may depend on a measurement resolution of the source side light intensity distribution. Also, the number of transparency values may depend on the resolution of different transparency values that is achievable on the semi-transparent layer. It is pointed out that the number of the plurality of transparency values does not have to be equal to the number of the plurality of source side light intensity values. It is only important in this context that there is a defined correspondence between the source side light intensity values and the transparency values, i.e. that for each transparency value or for each source side light intensity value, exactly one source side light intensity value or transparency value is the corresponding value. Both the transparency values and the source side light intensity values may be normalized values. The normalization may be done with respect to a particular one of the transparency values and a particular one of the source side light intensity values, such as the lowest, the highest or the average value.

According to a further embodiment, the at least one light source is one light source or two light sources or three light sources. In other words, the interior aircraft light unit may comprise exactly one light source or exactly two light sources or exactly three light sources. Due to the shading of certain regions of the source side light intensity distribution via the semi-transparent layer, the light source(s) can be operated at a high power rating, emitting high amount(s) of light. In this way, such a low number of light sources, such as one, two or three light sources, may be sufficient for achieving the desired overall light yield.

According to a further embodiment, the at least one light source is at least one LED. In other words, each of the at least one light source is an LED. LEDs are generally highly efficient light sources, having a large light yield per electric power. By means of the transparency distribution of the semi-transparent layer, the high directivity of the LEDs may be evened out, such that a very even adjusted light intensity distribution may be achieved without the need of complicated optical structures and/or without the need of running the LEDs below their efficient high power ratings.

According to a further embodiment, the semi-transparent layer is a film layer. In this way, the semi-transparent layer does not add much to the dimensions of the interior aircraft light unit. Such a film layer structure is a very space-efficient means of achieving the evening out of the source side light intensity distribution.

According to a further embodiment, the interior aircraft light unit further comprises a lens cover, with the semi-transparent layer being associated with the lens cover. In particular, the semi-transparent layer may be directly applied to the lens cover. The semi-transparent layer may be applied to the lens cover by any form of attachment, in particular by gluing the semi-transparent layer to the lens cover. In particular, the semi-transparent layer may have the form of a sticker to be applied to the lens cover during the assembly of the interior aircraft light unit. As the lens cover often comprises a planar section, it is an ideal structure for the application of the semi-transparent layer.

According to a further embodiment, the semi-transparent layer comprises a transparent carrier layer carrying a pattern of opaque elements, with a density of the opaque elements defining the transparency distribution. In this way, the semi-transparent layer performs a statistical shading of the source side light intensity distribution. While a larger portion of light rays are blocked in high intensity regions of the source side light intensity distribution, less light rays are blocked in low intensity regions of the source side light intensity distribution. As the human eye is not able to see the blocking action of the individual opaque elements, the human eye only perceives an evened out, continuous light intensity distribution on the outside of the interior aircraft light unit. The opaque elements may have an extension of less than 100 µm, in particular of less than 50 µm, in any given dimension along the transparent carrier layer. In this way, the opaque elements are small enough to not be recognizable during the use of the interior aircraft light unit. Elements of such an extension may be achieved with printers having a resolution of 250 dpi or higher, such as printers with a resolution of 800 dpi.

According to a particular embodiment, the opaque elements are opaque dots. The dots may have a generally circular shape. It is, however, also possible that the opaque elements have different shapes, such as square shapes or triangular shapes or irregular shapes.

According to a further embodiment, the opaque elements are white elements. In this way, the opaque elements are not discernible, in particular when the interior aircraft light unit is switched off.

According to a further embodiment, the opaque elements are printed onto the carrier layer. In other words, the semi-transparent layer with the pattern of opaque elements may be produced via a simple printing action. The transparency distribution may be achieved via one single operation, namely the printing thereof.

According to a further embodiment, the semi-transparent layer comprises an evenly transparent carrier layer carrying a plurality of elements of different opacity, with the plurality of elements of different opacity defining the transparency distribution. This embodiment is an alternative to the provision of the pattern of opaque elements. In this embodiment, inherently semi-transparent elements are provided in order to achieve the desired transparency distribution.

According to a further embodiment, the interior aircraft light unit is one of a signalling light unit and a general cabin illumination light unit. In other words, the interior aircraft light unit may be a signalling light unit. It may also be a light unit provided for general illumination of the aircraft cabin.

According to a further embodiment, the interior aircraft light unit is an exit signal light unit. The evening out of the source side light intensity distribution and the provision of the evened out adjusted light intensity distribution applies particularly well to exit signal light units, because FAR requirements are particularly strict with respect to the even nature of the light intensity distribution of such exit lights.

According to a further embodiment, the power consumption of the interior aircraft light unit may be in the range of 5 W to 30 W. The power consumption may also be below 10 W.

Exemplary embodiments of the invention further include a method of producing an interior aircraft light unit that comprises the following steps: providing at least one light source, emitting light with a source side light intensity distribution; measuring the source side light intensity distribution of the at least one light source and determining regions of different light intensity in the source side light intensity distribution, the regions of different light intensity comprising at least a first intensity region and a second intensity region, with the first intensity region having a higher light intensity than the second intensity region; providing a semi-transparent layer having a transparency distribution with regions of different degrees of transparency, the regions of different degrees of transparency comprising at least a first shading region and a second shading region, with the second shading region having a higher degree of transparency than the second shading region; and assembling the semi-transparent layer between the at least one light source and an outside of the interior aircraft light unit, with the semi-transparent layer being placed in such a way with respect to the at least one light source that the first shading region corresponds to the first intensity region and that the second shading region corresponds to the second intensity region, wherein the semi-transparent layer transforms the source side light intensity distribution into an adjusted light intensity distribution that is closer to an even light intensity distribution than the source side light intensity distribution. The modifications and advantages discussed above with respect to the various embodiments of the interior aircraft light unit apply to the method of producing an interior aircraft light unit in an analogous manner.

The method of producing an interior aircraft light unit is particularly suitable for a mass production of such interior aircraft light units. It is possible to measure the source side light intensity distribution only once for a particular kind of arrangement of light source(s). This one measurement may be used as the basis for determining the transparency distribution of the semi-transparent layer, which transparency distribution is used for all interior aircraft light units of that kind. While it is possible that the source side light intensity distribution and the transparency distribution of any given interior aircraft light unit do not perfectly match in this case, the resulting evening out of the source side light intensity distribution is generally within acceptable limits.

BRIEF DESCRIPTION OF DRAWINGS

Further exemplary embodiments are described with respect to the accompanying drawings, wherein.

DETAILED DESCRIPTION OF THE INVENTION

Figure 1:
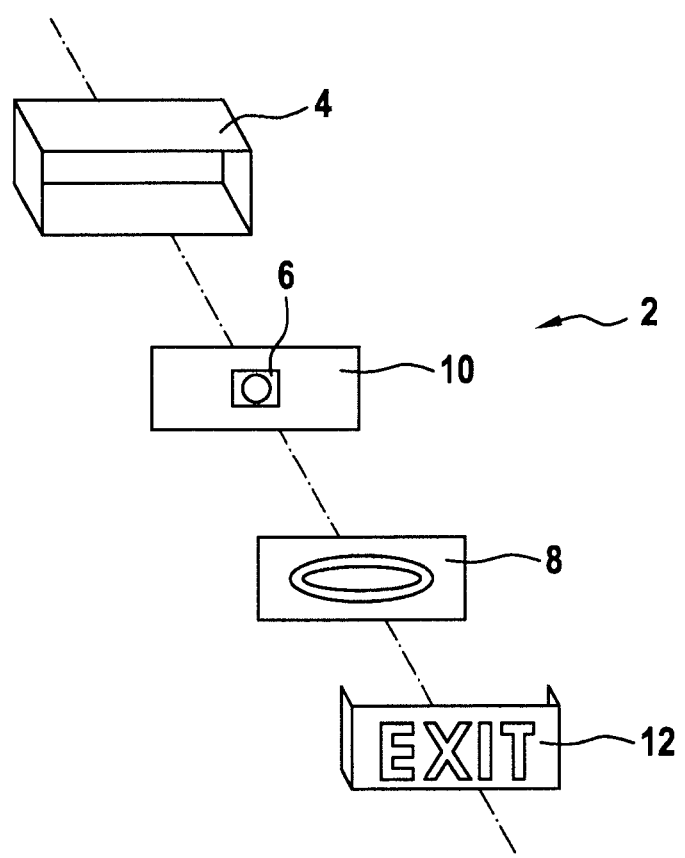
FIG. 1 is an exploded view of an interior aircraft light unit in accordance with an exemplary embodiment of the invention.

FIG. 1 shows an interior aircraft light unit 2 in accordance with an exemplary embodiment of the invention. The interior aircraft light unit 2 is shown in an exploded view, such that the individual elements can be seen better.

The interior aircraft light unit 2 comprises a housing 4, a mounting plate 10, to which an LED 6 is mounted, a semi-transparent layer 8, and a lens cover 12. The housing 4 is a generally cuboid structure in the exemplary embodiment of FIG. 1. The mounting plate 10 has a generally planar front surface, and the LED 6 is mounted to substantially the middle of the mounting plate 10. When assembled, the mounting plate 10 is positioned towards the back of the housing 4.

The lens cover 12 has a generally flat front portion and two side portions, with which the lens cover 12 is clipped onto the housing 4 during the assembly. The lens cover 12 is made of a generally transparent, white material, with the word exit being formed in red letters. During the assembly, the semi-transparent layer 8 is applied to the inside of the lens cover 12. In this way, a distance is formed between the LED 6 and the semi-transparent layer 8.

The semi-transparent layer 8 comprises different regions of different levels of transparency. These different levels of transparency are indicated in the exemplary embodiment of FIG. 1 by the oval shapes depicted on the semi-transparent layer 8. A detailed description thereof will be made with respect to FIGS. 2 and 3.

Figure 2A:
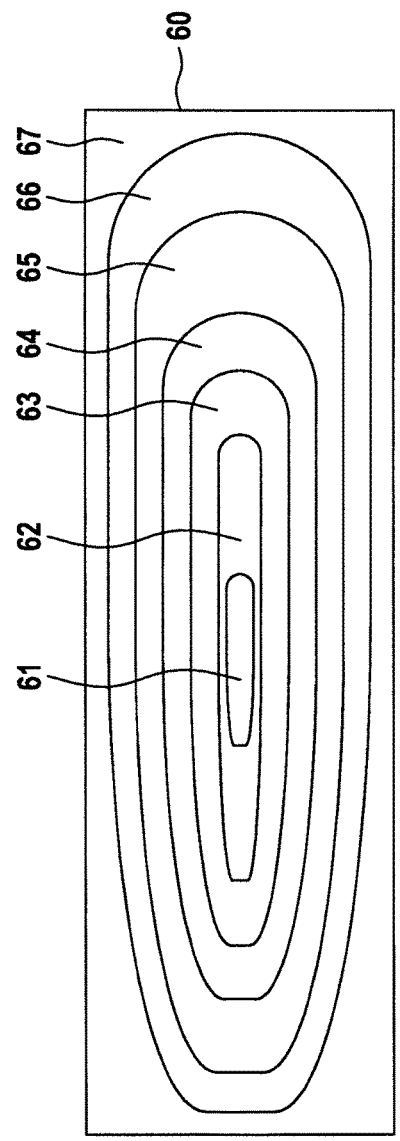
FIG. 2a-FIG. 2b shows a first exemplary source side light intensity distribution and an associated transparency distribution.

FIG. 2 shows an exemplary light intensity distribution 60 in FIG. 2a. The exemplary light intensity distribution 60 is projected onto the plane of the semi-transparent layer, such that the distribution of FIG. 2a may also be seen as a luminance distribution. FIG. 2a shows a plurality of iso-luminance lines, i.e. lines that indicate respective locations with the same luminance values. The six depicted iso-luminance lines split the projected plane of FIG. 2a into seven intensity regions 61 to 67. The first intensity region 61 is surrounded by the second intensity region 62, which in turn is surrounded by the third intensity region 63, which in turn is surrounded by the fourth intensity region 64, which in turn is surrounded by the fifth intensity region 65, which in turn is surrounded by the sixth intensity region 66, which in turn is surrounded by the seventh intensity region 67. The intensity regions 61-67 decrease in light intensity, i.e. the light intensity in the first intensity region 61 is higher than in the second intensity region 62, which in turn is higher than in the third intensity region 63, etc. It can also be said that the luminance in the first intensity region 61 is higher than the luminance in the second intensity region 62, which in turn is higher than the luminance in the third intensity region 63, etc.

It is pointed out that the light intensity/luminance does not necessarily have a constant value in any of the first to seventh intensity regions 61 to 67. Rather, in the exemplary embodiment of FIG. 2, the light intensity/luminance may exhibit a constant decrease from the center of the depicted plane of FIG. 2a towards the edges. It is, however, the case that e.g. every location in the third intensity region 63 has a lower light intensity/luminance than any given location in the second intensity region 62. The same is true for comparing the other intensity regions.

Figure 2B:
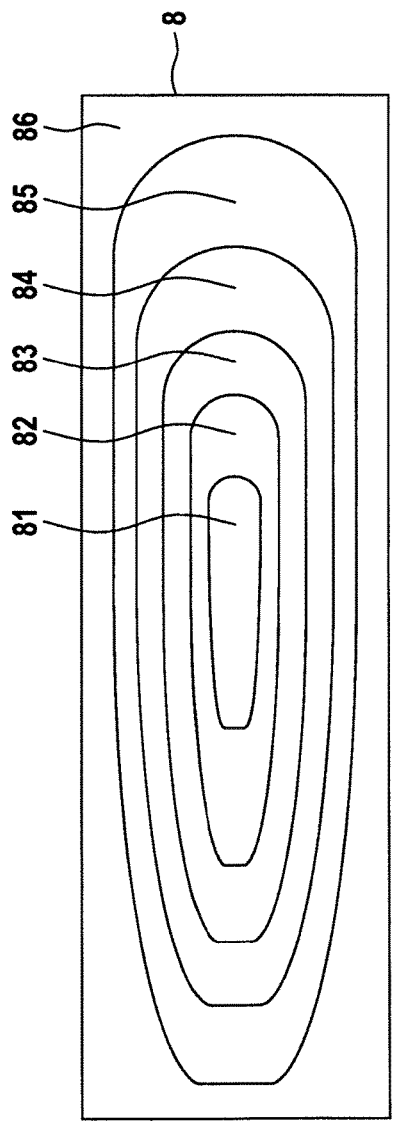

FIG. 2b shows an exemplary transparency distribution of an exemplary semi-transparent layer 8. In the exemplary embodiment of FIG. 2b, the semi-transparent layer 8 has six shading regions 81 to 86. The first shading region 81 is arranged around the center of the semi-transparent layer 8 and is surrounded by the second shading region 82, which in turn is surrounded by the third shading region 83, which in turn is surrounded by the fourth shading region 84, which in turn is surrounded by the fifth shading region 85, which in turn is surrounded by the sixth shading region 86. Again, the lines between the shading regions are iso-transparency lines, i.e. they are respective locations of equal transparency of the semi-transparent layer 8. Again, the transparency is not constant in any of the first to sixth shading regions 81 to 86. Rather, the transparency may have a continuously increasing distribution from the center of the semi-transparent layer 8 towards the edges thereof. It is pointed out, however, that it is also possible that each of the shading regions may also have a constant transparency within that region. It is further pointed out that more or less than the depicted six shading regions may be provided.

All locations in the first shading region 81 have a lower transparency than the locations in the second shading region 82, which in turn have a lower transparency than the locations in the third shading region 83, etc. This statement may be true for each and every spot of the transparency distribution. However, it is also possible that this statement is true on a statistical scale, meaning that somewhat larger areas within the respective shading regions have this property, wherein the level of transparency is defined by the density of completely opaque spots versus completely transparent spots.

As can be seen from the comparison of FIG. 2a with FIG. 2b, while the light intensity/luminance goes down from the center of the projected plane of FIG. 2a towards the edges thereof, the transparency of the semi-transparent layer 8 goes up from the center thereof to the edges thereof. In this way, the semi-transparent layer evens out the source side light intensity distribution, as depicted in FIG. 2a, by transforming it into an adjusted light intensity distribution that is closer to an even light intensity distribution.

This is nicely illustrated by looking at an example of particular intensity regions and their shading via the transparency distribution. For example, the light emitted by the LED 6 in the first intensity region 61 is partially blocked by the first shading region 81, which has a low transparency and thus blocks much of the light emitted in the first intensity region. In contrast thereto, the light emitted by the LED 6 in the fifth intensity region 65 is not blocked to such a high degree. The light emitted in the fifth intensity region 65 is partially blocked by the fourth and fifth shading regions 84 and 85. As these fourth and fifth shading regions 84 and 85 have a higher transparency than the first shading region 81, the light of the fifth intensity region 65 is not blocked to such a high degree as the light of the first intensity region 61. Accordingly, when comparing the resulting adjusted light intensity between the first and fifth intensity regions, these values are much closer than the light intensity values in the first and fifth intensity regions in the source side light intensity distribution.

Figure 3A:
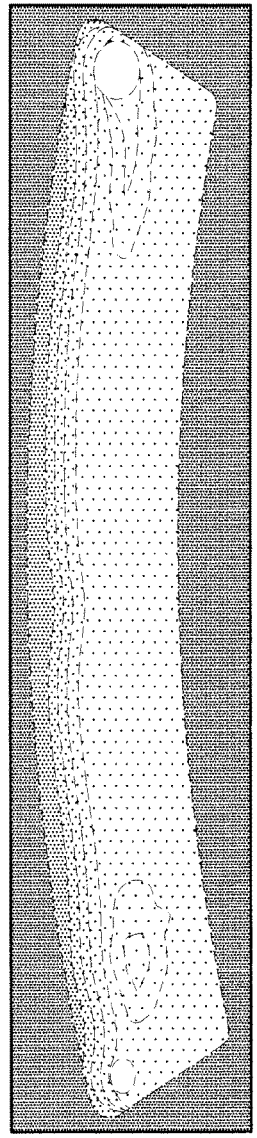
FIG. 3a-FIG. 3b shows a second exemplary source side light intensity distribution and an associated transparency distribution.
Figure 3B:
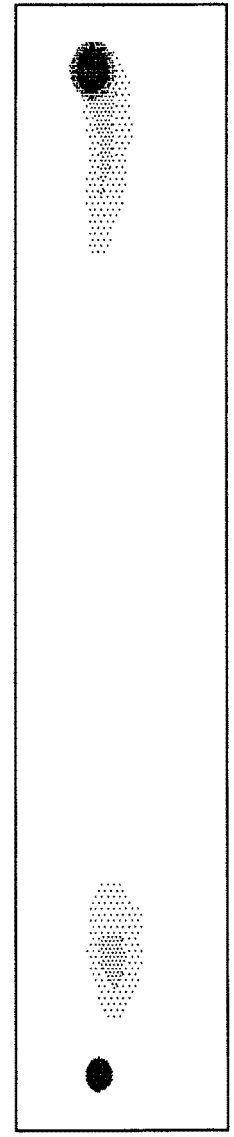

FIG. 3 shows a second exemplary embodiment of a source side light intensity distribution, depicted in FIG. 3a, and a transparency distribution of the semi-transparent layer, depicted in FIG. 3b, both distributions shown as grey-scale images. FIG. 3a shows the source side light intensity distribution of an interior aircraft light unit having two LEDs as light sources. The two LEDs are arranged towards the top left corner and towards the top right corner of the interior aircraft light unit. In accordance therewith, two spots, arranged towards the two top corners of the projection plane of FIG. 3a, have the highest light intensity/luminance, indicated as white dots. As can be seen in FIG. 3a by the darkening to the outside from the positions of the light sources, the light intensity/luminance decreases towards the center of the projected plane of FIG. 3a and towards the edges.

FIG. 3b shows a transparency distribution that corresponds to the inverse of the light intensity distribution of FIG. 3a. In particular, the density of opaque dots, represented by black dots in the exemplary representation of FIG. 3b, defines the level of transparency of the respective regions. Again, by applying the transparency distribution of FIG. 3b to the light intensity/luminance distribution of FIG. 3a, an adjusted light intensity distribution is provided that is closer to an even light intensity distribution than the source side light intensity distribution, depicted in FIG. 3a.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Interior aircraft light unit, comprising:
   at least one light source, in operation emitting light with a source side light intensity distribution, the source side light intensity distribution comprising a first intensity region and a second intensity region, with the first intensity region having a higher light intensity than the second intensity region, and
   a semi-transparent layer, disposed between the at least one light source and an outside of the interior aircraft light unit, for transforming the source side light intensity distribution into an adjusted light intensity distribution,
   wherein the semi-transparent layer has a transparency distribution having a lower degree of transparency in the first intensity region than in the second intensity region, such that the adjusted light intensity distribution is closer to an even light intensity distribution than the source side light intensity distribution;
   wherein the at least one light source is at least one LED,
   wherein the adjusted light intensity distribution has a ratio between its maximum light intensity and its minimum light intensity of at most 3, and
   wherein the interior aircraft light unit is a signalling light unit for providing signalling information in an aircraft cabin.

2. Interior aircraft light unit according to claim 1, wherein each of the at least one light source has a main light emission direction and wherein the first intensity region includes the main light emission direction of the at least one light source.

3. Interior aircraft light unit according to claim 1, wherein the source side light intensity distribution has a ratio between its maximum light intensity and its minimum light intensity of more than 10, in particular of more than 20.

4. Interior aircraft light unit according to claim 1, wherein the transparency distribution of the semi-transparent layer corresponds to an inverse of the source side light intensity distribution.

5. Interior aircraft light unit according to claim 1, wherein the transparency distribution of the semi-transparent layer consists of a plurality of transparency values and wherein the source side light intensity distribution consists of a plurality of source side light intensity values, with each of the plurality of transparency values being within +/−50% of an inverse of the corresponding source side light intensity value, in particular within +/−20%.

6. Interior aircraft light unit according to claim 1, wherein the at least one light source is one light source or two light sources or three light sources.

7. Interior aircraft light unit according to claim 1, wherein the semi-transparent layer is a film layer.

8. Interior aircraft light unit according to claim 1, wherein the semi-transparent layer comprises a transparent carrier layer carrying a pattern of opaque elements, with a density of the opaque elements defining the transparency distribution.

9. Interior aircraft light unit according to claim 8, wherein the opaque elements are printed onto the carrier layer.

10. Interior aircraft light unit according to any of claim 7, wherein the semi-transparent layer comprises an evenly transparent carrier layer carrying a plurality of elements of different opacity, with the plurality of elements of different opacity defining the transparency distribution.

11. Interior aircraft light unit according claim 1, wherein the interior aircraft light unit is an exit signal light unit.

12. Method of producing an interior aircraft light unit, comprising the steps of:

providing at least one light source, emitting light with a source side light intensity distribution, wherein the at lone light source is at least one LED, measuring the source side light intensity distribution of the at least one light source and determining regions of different light intensity in the source side light intensity distribution, the regions of different light intensity comprising at least a first intensity region and a second intensity region, with the first intensity region having a higher light intensity than the second intensity region, providing a semi-transparent layer having a transparency distribution with regions of different degrees of transparency, the regions of different degrees of transparency comprising at least a first shading region and a second shading region, with the second shading region having a higher degree of transparency than the second shading region, and assembling the semi-transparent layer between the at least one light source and an outside of the interior aircraft light unit, with the semi-transparent layer being placed in such a way with respect to the at least one light source that the first shading region corresponds to the first intensity region and that the second shading region corresponds to the second intensity region, wherein the semi-transparent layer transforms the source side light intensity distribution into an adjusted light intensity distribution that is closer to an even light intensity distribution than the source side light intensity distribution, wherein the adjusted light intensity distribution has a ratio between its maximum light intensity and its minimum light intensity of at most 3, wherein the interior aircraft light unit is a signalling light unit for providing signalling information in an aircraft cabin.

* * * * *